(12) United States Patent
Debbouz et al.

(10) Patent No.: US 9,945,246 B2
(45) Date of Patent: *Apr. 17, 2018

(54) MONITORING OF A DEGREE OF COKING AT DYNAMIC SEALS BY A STARTER

(71) Applicant: TURBOMECA, Bordes (FR)

(72) Inventors: Nadir Christian Debbouz, Moissy-Cramayel (FR); Francois Xavier Marie Faupin, Moissy-Cramayel (FR); Fabien Lamazere, Moissy-Cramayel (FR)

(73) Assignee: TURBOMECA, Bordes (FR)

( * ) Notice: Subject to any disclaimer, the term of this patent is extended or adjusted under 35 U.S.C. 154(b) by 214 days.

This patent is subject to a terminal disclaimer.

(21) Appl. No.: 15/021,071

(22) PCT Filed: Sep. 10, 2014

(86) PCT No.: PCT/FR2014/052238
§ 371 (c)(1),
(2) Date: Mar. 10, 2016

(87) PCT Pub. No.: WO2015/036694
PCT Pub. Date: Mar. 19, 2015

(65) Prior Publication Data
US 2016/0230589 A1    Aug. 11, 2016

(30) Foreign Application Priority Data
Sep. 13, 2013  (FR) ...................................... 1358857

(51) Int. Cl.
*F01D 19/00*    (2006.01)
*G01M 13/00*    (2006.01)
(Continued)

(52) U.S. Cl.
CPC ............ *F01D 21/003* (2013.01); *F02C 7/222* (2013.01); *F02C 7/26* (2013.01); *F02C 7/268* (2013.01);
(Continued)

(58) Field of Classification Search
CPC ................................ G01F 1/69; F02M 65/001
See application file for complete search history.

(56) References Cited

U.S. PATENT DOCUMENTS 5,050,451 A * 9/1991 Hussain ................ B60W 10/06
                                                                477/120
5,281,347 A * 1/1994 Igarashi ............... C10M 169/04
                                                                508/363
(Continued)

FOREIGN PATENT DOCUMENTS

EP    1605148        12/2005
EP    2096434 A2 *  9/2009  ............. F01M 11/10
FR    2942001         8/2010

OTHER PUBLICATIONS

International Search Report dated Dec. 22, 2014, Application No. PCT/FR2014/052238, 5 pages.
(Continued)

*Primary Examiner* — Jill Culler
*Assistant Examiner* — Ruben Parco, Jr.
(74) *Attorney, Agent, or Firm* — Womble Bond Dickinson (US) LLP

(57) ABSTRACT

The invention relates to a method (1000) for monitoring a degree of coking at the dynamic seals of a turbine engine comprising:
a gas generator, comprising a rotary shaft and an injection wheel mounted on said shaft,
an injection manifold,
dynamic seals for ensuring a seal between the injection wheel and the injection manifold, and
(Continued)

a starter, the method comprising the steps:

measuring (1500), during a phase for initiating rotation of the shaft of the gas generator by the starter, a current flowing through the starter and a voltage on the terminals of the starter, determining (1600), from the measured current and voltage, a degree of coking at the dynamic seals.

The invention also relates to a turbine engine comprising a system for monitoring a degree of coking.

9 Claims, 6 Drawing Sheets

(51) Int. Cl.
| | | |
|---|---|---|
| *F01D 21/00* | (2006.01) | |
| *F02C 7/26* | (2006.01) | |
| *F02C 7/268* | (2006.01) | |
| *F02C 7/275* | (2006.01) | |
| *F02C 7/22* | (2006.01) | |
| *F02C 7/28* | (2006.01) | |
| *F23R 3/38* | (2006.01) | |

(52) U.S. Cl.
CPC ............... *F02C 7/275* (2013.01); *F02C 7/28* (2013.01); *F23R 3/38* (2013.01); *F05D 2220/30* (2013.01); *F05D 2240/60* (2013.01); *F05D 2260/80* (2013.01); *F05D 2260/85* (2013.01)

(56) References Cited

U.S. PATENT DOCUMENTS

| | | |
|---|---|---|
| 2005/0279102 A1 | 12/2005 | O'Connor |
| 2007/0084214 A1 | 4/2007 | Schmidt et al. |
| 2008/0184776 A1* | 8/2008 | Staley .................... G01M 3/32 73/37 |
| 2009/0121706 A1* | 5/2009 | Ante ....................... F01D 17/06 324/173 |
| 2016/0053884 A1* | 2/2016 | Versteyhe ........... F16H 57/0405 73/10 |

OTHER PUBLICATIONS

French Search Report dated Jan. 10, 2014, Application No. FR1358857, 4 pages.

Written Opinion dated Sep. 10, 2014, Application No. PCT/FR2014/052238, 5 pages.

Written Opinion dated Sep. 13, 2013, Application No. FR1358857, 4 pages.

* cited by examiner

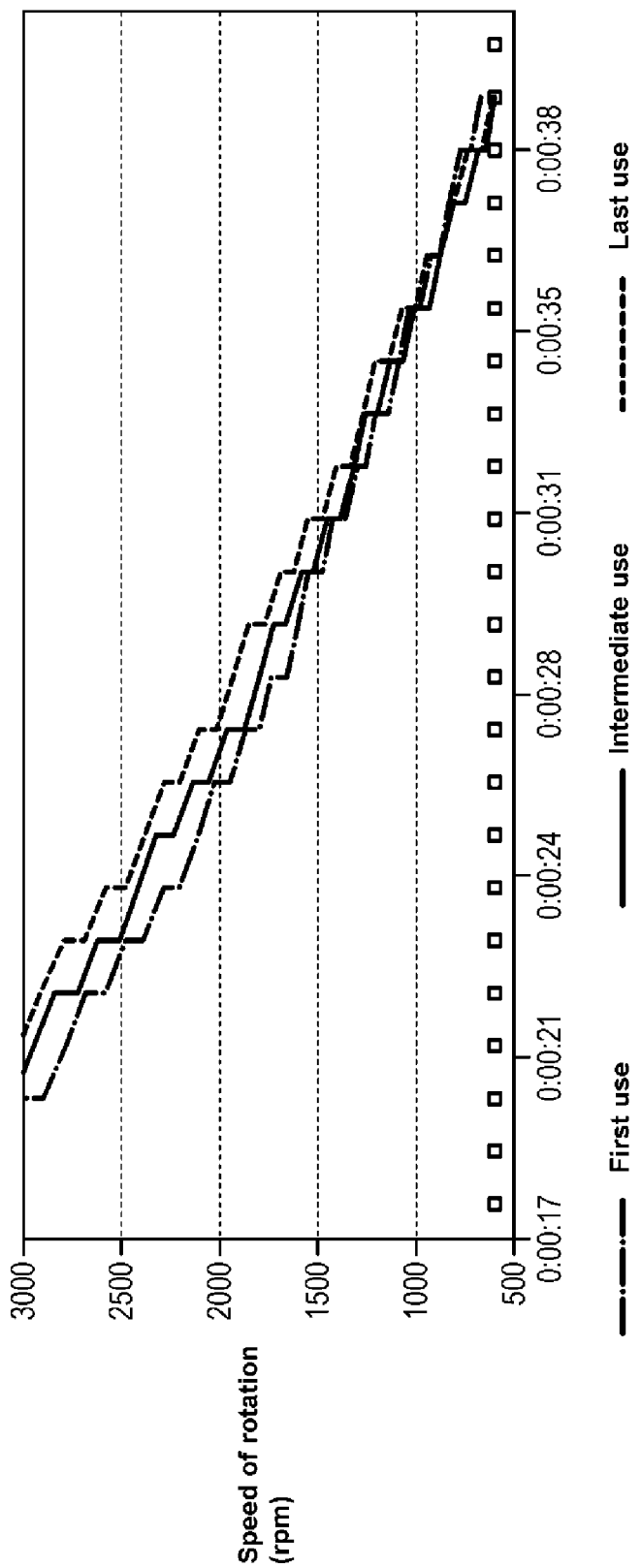

MONITORING OF A DEGREE OF COKING AT DYNAMIC SEALS BY A STARTER

FIELD OF THE INVENTION

The field of the invention is that of the monitoring of the degree of coking at dynamic seals in a turbine engine, and of turbine engines equipped with systems allowing said monitoring.

STATE OF THE ART

With reference to FIG. 1a, certain turbine engines 1, like for example turbomotors, comprise a gas generator 10 comprising a rotary shaft 11 on which is mounted an injection wheel 12, which is therefore itself rotary.

The injection wheel has a plurality of orifices which open into a combustion chamber 30. In this way, the injection wheel, during its rotation, sprays fuel by centrifugation into the combustion chamber.

With reference to FIG. 1b, the turbine engine also comprises an injection manifold 20, which is a fixed axisymmetrical part mounted around the shaft 11 of the gas generator 10.

The injection manifold conveys fuel as far as the injection wheel. The fuel flows in an internal conduit 21 of the injection manifold, and opens into a cavity 22 before penetrating into the injection wheel.

In order to ensure the seal between the injection wheel and the manifold, a plurality of dynamic seals such as labyrinth seals 23 are provided.

Now, it often happens that coke forms in the grooves of these seals, consequently causing the occurrence of friction between the injection wheel and the injection manifold. The friction may be worsened until it causes complete blocking of the shaft of the gas generator; it is then no longer possible to start the engine.

In the case of difficulties with starting, the operators carry out operations for searching faults described in a maintenance manual of the turbine engine. These searching operations are generally long and not very efficient, since sometimes a significant time has to be spent before the cause of the starting difficulties is detected, in this case, coking at the dynamic seals (indeed, many other causes may be contemplated).

Further, these searching operations imply unplanned unavailability of the turbine engine, and therefore of the aircraft in which it is installed, which may further require cancellation of one or several planned flight missions. These operations therefore represent a significant cost.

No alternative method allowing anticipation of the blocking of the shaft of the gas generator because of coking at dynamic seals, and thereby giving the possibility of avoiding fault-searching operations, has ever been proposed.

Therefore there exists a need for a method for monitoring a degree of coking at the dynamic seals.

PRESENTATION OF THE INVENTION

The object of the invention is to find a remedy to the problem presented herein before, by proposing a method for monitoring a degree of coking at the dynamic seals of a turbine engine.

Another object of the invention is to be able to monitor this degree of coking upon using the turbine engine, without imposing any unavailability of the turbine engine.

In this respect, the object of the invention is a method for monitoring a degree of coking at the dynamic seals of a turbine engine comprising:
  a gas generator, comprising a rotary shaft and an injection wheel mounted on said shaft, the wheel being adapted for spraying fuel by centrifugation,
  an injection manifold, adapted for conveying fuel as far as the injection wheel,
  dynamic seals adapted for ensuring a seal between the injection wheel and the injection manifold, and
  a starter, adapted for driving into rotation the shaft of the gas generator during a starting phase of the turbine engine,
the method being characterized in that it comprises the steps:
  measuring during a phase for initiating the rotation of the shaft of the gas generator by the starter during the starting of the turbine engine, a current flowing through the starter and a voltage on the terminals of the starter,
  determining, from the measured current and voltage, a degree of coking at the dynamic seals.

Advantageously, but optionally, the method according to the invention may further comprise at least one of the following features:
  the step for determining the degree of coking at the dynamic seals comprises the determination of a datum representative of a resistive torque of the shaft of the gas generator.
  the step for determining the degree of coking at the dynamic seals comprises the application of a step from among the following group:
    comparing the determined representative datum of the resistive torque with a predetermined threshold,
    determining a difference between the determined datum and a representative datum of the initial resistive torque of the shaft, and comparing the difference with a predetermined threshold, and
    determining, from previous measurements of the representative datum of the resistive torque, a change in said datum depending on the use of the turbine engine, and comparing said change rate with a predetermined threshold.
  the method further comprises measurement, during a self-rotation phase of the shaft of the gas generator, of a speed of rotation of said shaft.
  the step for determining a degree of coking at the dynamic seals is carried out from measurements of current flowing through the starter and of voltage on the terminals of the starter and from measurements of the speed of rotation of the shaft of the gas generator.

The object of the invention is also a system for monitoring a degree of coking at the dynamic seals of a turbine engine comprising:
  a gas generator, comprising a rotary shaft and an injection wheel mounted on said shaft, the wheel being adapted for spraying fuel by centrifugation,
  an injection manifold, adapted for conveying fuel as far as the injection wheel,
  dynamic seals, adapted for ensuring a seal between the injection wheel and the injection manifold, and
  a starter, adapted for driving into rotation the gas generator shaft during a starting phase of the turbine engine,
the monitoring system being adapted for applying the monitoring method presented herein before, and comprising:
  at least one device for measuring a voltage on the terminals of the starter and of the current flowing through it, a processing unit, including a memory and adapted processing means for processing the current and voltage measurements for determining a degree of coking at the dynamic seals.

Advantageously, but optionally, the monitoring system according to the invention further has at least one of the following features:

the measurement device is adapted for acquiring voltage and current measurements at a frequency greater than or equal to 10 Hz.

The system further comprises at least one sensor for the speed of rotation of the shaft of the gas generator, adapted so as to carry out acquisitions at a frequency greater than or equal to 2 Hz.

The object of the invention is further a turbine engine comprising:

a gas generator, comprising a rotary shaft and an injection wheel mounted on said shaft, the wheel being adapted for spraying fuel by centrifugation, an injection manifold, fixedly mounted with respect to the generator shaft, and adapted for conveying fuel as far as the injection wheel, dynamic seals, adapted for ensuring a seal between the injection wheel and the injection manifold, and a starter, adapted for driving into rotation the shaft of the gas generator during a starting phase of the turbine engine, the turbine engine being characterized in that it further comprises a monitoring system according to the preceding presentation.

The thereby proposed monitoring method gives the possibility of evaluating a degree of coking at the dynamic seals of a turbine engine, and of detecting a critical stage before impossibility of starting the turbine engine.

This allows if required planning maintenance for cleaning or replacing the dynamic seals.

DESCRIPTION OF THE FIGURES

Other features, objects and advantages of the invention will become apparent from the description which follows, which is purely illustrative and non limiting, and which should be read with reference to the appended drawings wherein:

FIG. 3a illustrates the period for decelerating the shaft of the gas generator for different degrees of use of the turbine engine.

DETAILED DESCRIPTION OF AT LEAST ONE EMBODIMENT OF THE INVENTION

Figure 2A:
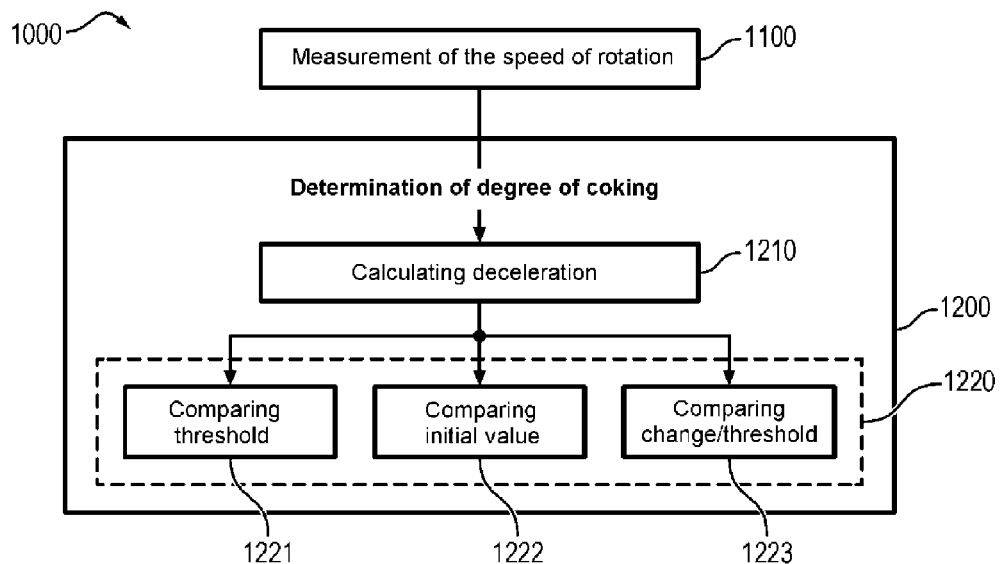
FIGS. 2a and 2b illustrate the main steps of a monitoring method according to two embodiments of the invention.
Figure 2B:
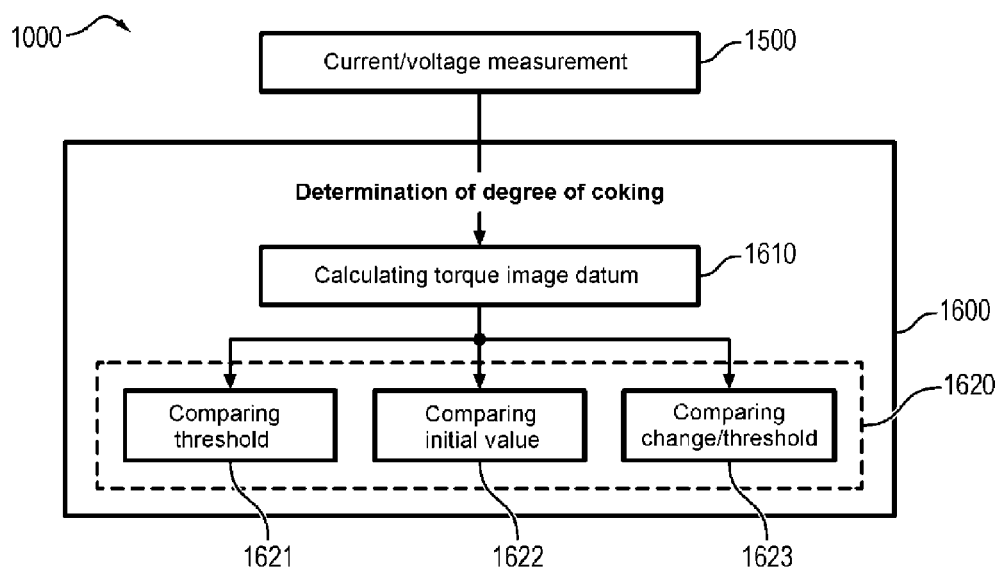

In FIGS. 2a and 2b two embodiments of a method for monitoring the coking at the dynamic seals of a turbine engine are illustrated.

Figure 1A:
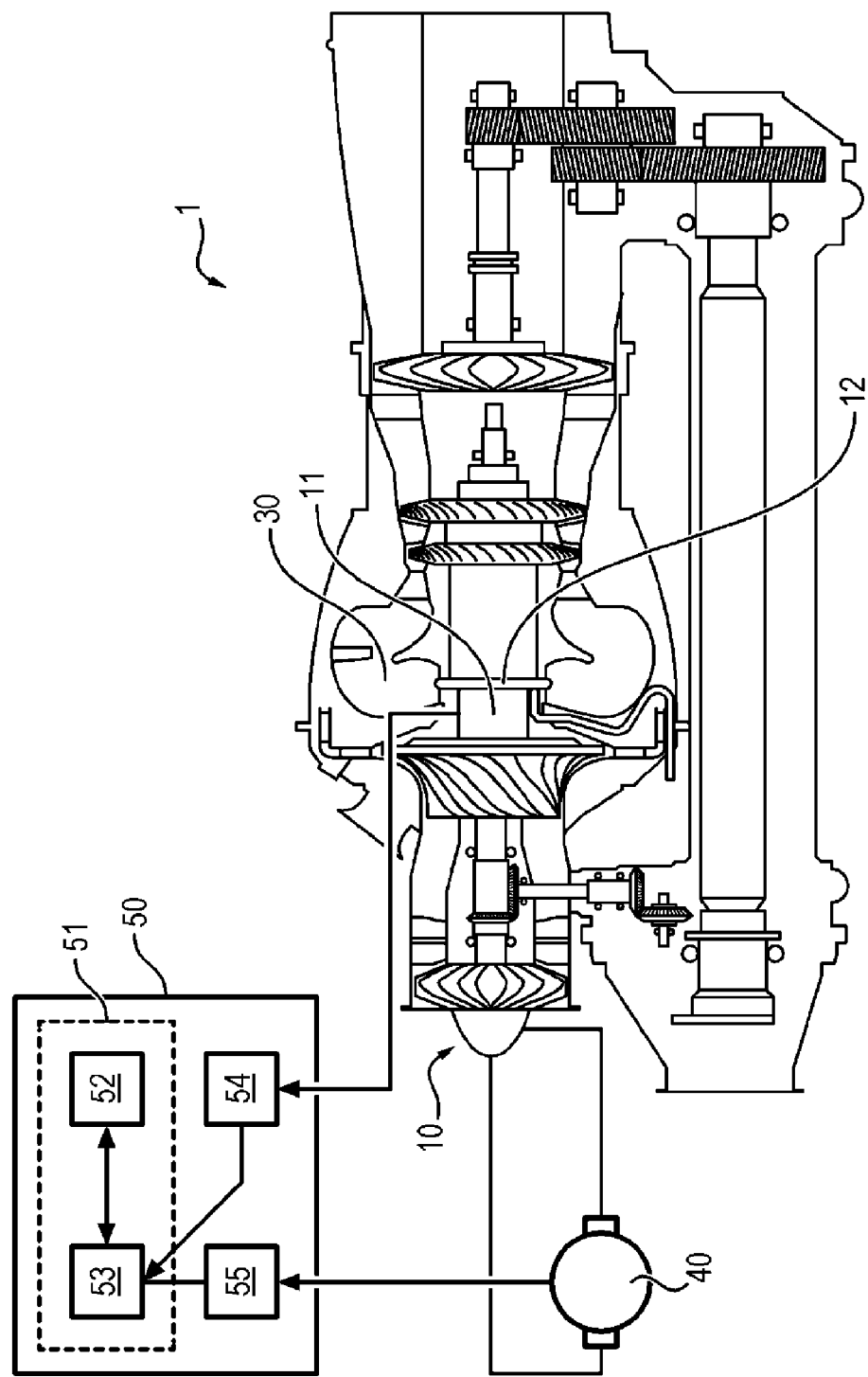
FIGS. 1a and 1b, already described, schematically illustrate the principle of operation of a turbine engine equipped with an injection wheel.
Figure 1B:
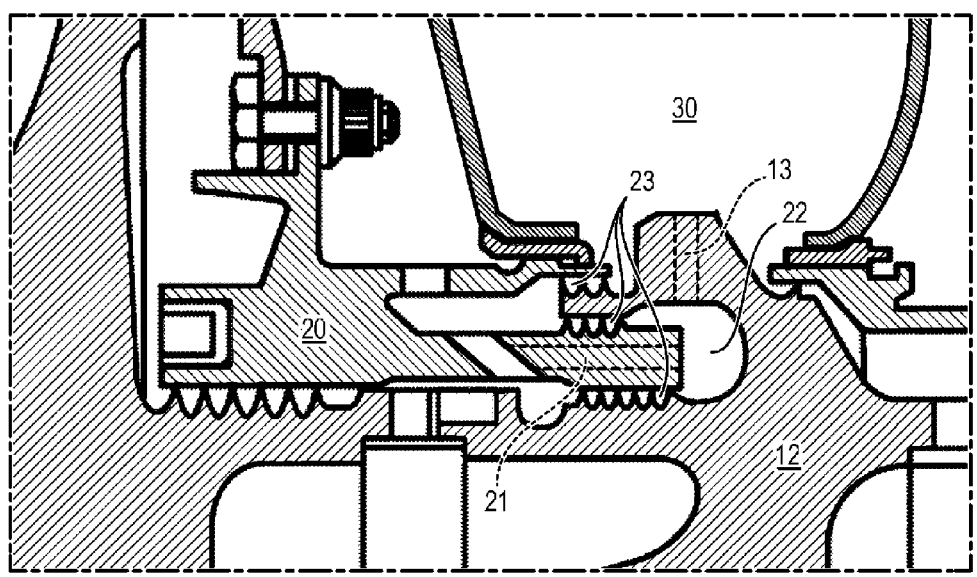

Like in the illustration of FIG. 1a, the turbine engine 1 which may be a turbomotor, comprises a gas generator 10, comprising a rotary shaft 11, driving into rotation an injection wheel 12 mounted on the latter.

The turbine engine further comprises a fixed injection manifold 20, which is an axisymmetrical part around the shaft of the gas generator. The injection manifold 20 comprises at least one internal duct 21 which opens into a circumferential cavity 22.

The turbine engine also comprises a combustion chamber 30 in which takes place the ignition of the fuel for propelling the aircraft in which is mounted the turbine engine.

The injection wheel 12 comprises radial internal channels 13 which open on one side into the circumferential cavity 22 and on the other side into the combustion chamber 30.

The fuel is conveyed through the injection manifold as far as the cavity 22, where it is then driven into the injection wheel 12 through opening orifices from the channels 13 laid out in the latter. The fuel is then sprayed into the combustion chamber by centrifugation resulting from the rotary movement of the injection wheel.

In order to ensure the seal between the movable injection wheel 12 and the fixed injection manifold 20, the turbine engine further comprises a plurality of dynamic seals 23, advantageously of the labyrinth seal type.

Thus, the fuel present in the cavity 22 does not leak into the other sectors of the turbine engine.

The turbine engine further comprises a starter 40 which gives the possibility of driving into rotation the shaft of the gas generator during a starting phase of the turbine engine.

In particular, the starting phase comprises a first period which lasts for about 4 seconds, during which the combustion chamber is not ignited and the shaft of the gas generator is driven into rotation exclusively by the starter. This phase is subsequently called "initiation phase of the rotation of the shaft of the gas generator".

The starting phase then comprises a second period, during which the combustion chamber is ignited, and the shaft of the gas generator accelerates under the simultaneous action of the starter and of the thermal power of the turbine engine.

The turbine engine finally comprises a system 50 for monitoring the degree of coking at the dynamic seals.

This system comprises a processing unit 51, which is connected to one or several sensors, and which is adapted for recovering the measurements of the sensors and for processing them in a way which is explained hereafter for inferring therefrom a degree of coking at the dynamic seals.

The processing unit 51 may be integrated to the turbine engine or alternatively be separated therefrom, for example by being mounted in the aircraft or in a monitoring central system on the ground. If necessary, communication of the data between the sensor(s) and the processing unit may be achieved during the use of the turbine engine by wireless communication or else be achieved occasionally during a stopping phase of the turbine engine, by recovering the data on the sensors and loading them into the processing unit.

The processing unit advantageously comprises a memory 52 giving the possibility of storing the measurements made during the previous uses of the turbine engine, and means for processing data like a processor 53.

The monitoring system also comprises, according to a first embodiment corresponding to the method of FIG. 2a, a sensor 54 for the speed of the shaft of the gas generator, which is adapted for measuring said speed at a frequency greater than or equal to 1 Hz, preferably greater than or equal to 2 Hz.

According to a second embodiment corresponding to the method of FIG. 2b, the monitoring system 50 comprises a device 55 for measuring a voltage on the starter terminals 40 and a current flowing through it, which is adapted for measuring these data at a frequency greater than or equal to 2 Hz, preferably greater than or equal to 10 Hz.

Both indicators used for monitoring the degree of coking at the seals may be combined for corroborating their results, the monitoring system advantageously comprises both a sensor 54 for the speed of rotation of the shaft and a device 55 for measuring the voltage on the terminals of the starter and the current flowing through it.

The monitoring system may also comprise other sensors giving the possibility of providing additional information to the processing unit for inferring therefrom a more accurate degree of coking at the seals.

Monitoring a Degree of Coking at Dynamic Seals by the Speed of Rotation of the Shaft of the Gas Generator.

With reference to FIG. 2a, a first embodiment of the method 1000 for monitoring the coking at the dynamic seals of the turbine engine 1 will now be described.

This method utilizes a first indicator which is the deceleration of the rotation of the shaft of the gas generator, during a self-rotation phase of the shaft. Self rotation takes place during a stopping phase of the turbine engine, when the shaft of the gas generator continues its rotation by its sole inertia but is no longer driven into rotation by another element.

During this step, the speed of rotation of the shaft of the gas generator is decreasing, but the deceleration may be more or less significant depending on the degree of coking at the dynamic seals. Indeed, the more the dynamic seals are coked, and more there exists friction between the injection manifold and the injection wheel, which slows down the relative movement between both of these elements.

Therefore, deceleration is more significant in the case of significant coking.

Further, this impact of the friction on the slowing down is in proportion larger under low speed conditions than with other factors having an influence on the slowing down such as aerodynamic friction, which, themselves, depend on the speed of rotation and are therefore in proportion less significant under low speed conditions.

Therefore, the study of the deceleration of the shaft 11 under low speed conditions provides an indication on the degree of coking at the dynamic seals.

The method therefore comprises a step 1100 for measuring a speed of rotation of the shaft of the gas generator of the turbine engine with the sensor 54, during a self-rotation phase of the shaft.

With reference to FIG. 3a, the deceleration of the shaft of the gas generator is illustrated between a speed of rotation of 3,000 rpm and a speed of 600 rpm for different uses of a turbine engine, the first measurement and the last measurement having been read out with a gap of about 250 uses of the turbine engine.

The slope of the speed of rotation is higher in absolute value for the last use, for which the amount of coke in the dynamic seals is larger.

Referring back to FIG. 2a, the method then comprises a step 1200 for determining, from the time-dependent change in the acquired speed of rotation, a degree of coking at the dynamic seals.

Indeed, as the speed of rotation has been read out at a frequency greater than 1 or 2 Hz during a deceleration phase of the shaft, it is possible to determine its slope, i.e. the deceleration of the shaft, between two determined speed values.

Herein before, it was indicated that the friction phenomena resulting from coking are more visible under low speed conditions. Therefore, speed values between which a deceleration is calculated comprise a first speed comprised between 1,000 and 2,500 revolutions per minute, preferably equal to 1,000 revolutions per minute, and a second speed of rotation comprised between 500 and 1,000 revolutions per minute, preferably equal to 700 revolutions per minute.

The processing unit therefore calculates the slope between both of these speeds during a step 1210. It may then, during a step 1220, infer the degree of coking at the dynamic seals in several ways.

According to a first embodiment, during step 1221, the processing unit compares the slope of the speed of rotation at one or several predetermined thresholds, corresponding to one or several determined degrees of coking; for example a degree of coking may correspond to a number of uses of the turbine engine before the gas generator is blocked.

The threshold may be established according to a large number of parameters depending on the turbine engine and on its conditions of use.

According to a second embodiment, during step 1222, the processing unit compares the value of the slope with an initial determined value in the same way during a first use or a first putting of the turbine engine into operation. The processing unit may calculate the difference between both slope values and compare this difference with a predetermined threshold so as to infer therefrom, as previously, a degree of coking at the seals.

Finally, according to a third embodiment, during a step 1223, the processing unit recovers calculated deceleration data under identical conditions and stored in the memory 52 and determines a changing rate of said deceleration depending on the use of the turbine engine, for example depending on a number of uses of the turbine engine (number of starts).

Figure 3B:
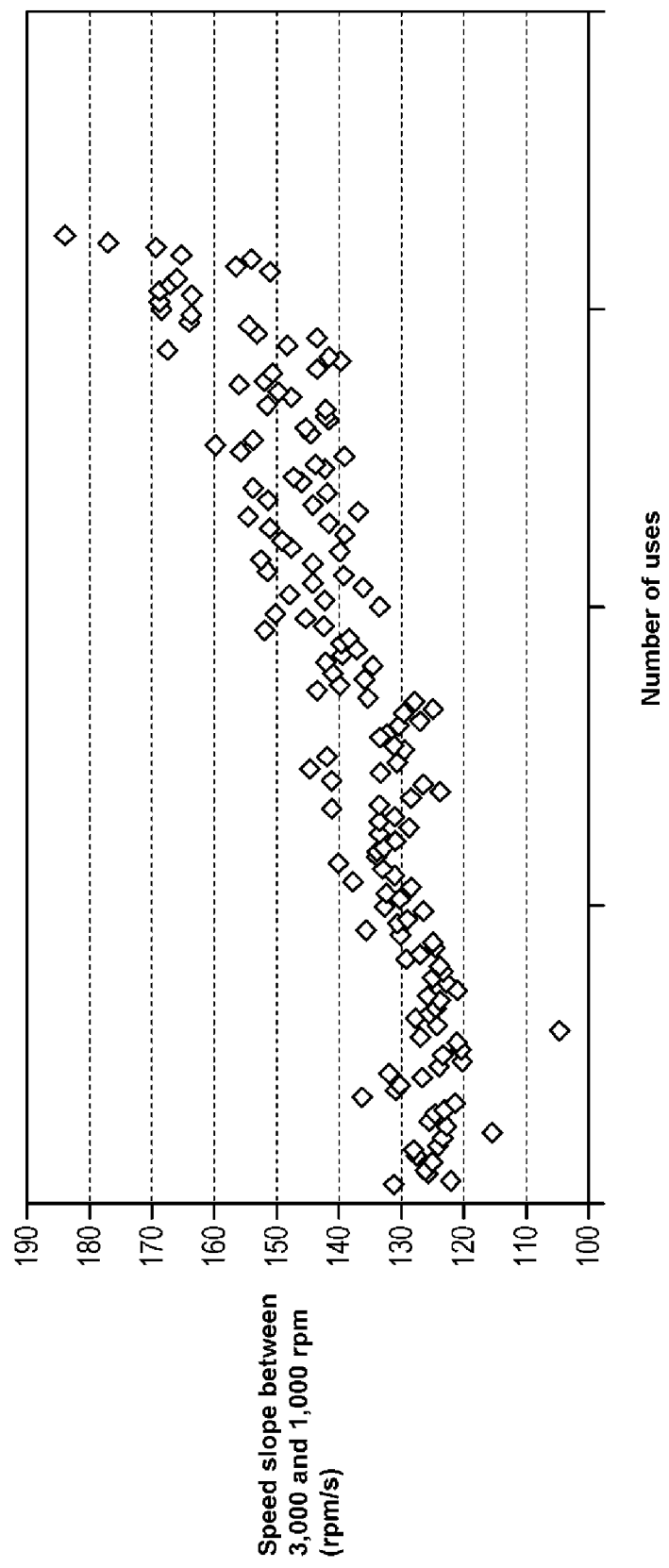
FIG. 3b illustrates the time-dependent change of a deceleration of a shaft of a gas generator depending on the use of the turbine engine.

With reference to FIG. 3b, a time-dependent change, depending on the use of the turbine engine, from the average value of the deceleration between 3,000 and 1,000 rpm is illustrated. It is seen that the slope of this time-dependent change also tends to increase, i.e. the deceleration increases more and more gradually as the degree of coking at the seals becomes significant.

Therefore, the step 1223 comprises the measurement of a changing rate of the deceleration calculated according to the use of the turbine engine, and comparing this changing rate with a predetermined threshold.

Monitoring a Degree of Coking at the Dynamic Seals by the Current Consumed by the Starter and by the Voltage on its Terminals.

With reference to FIG. 2b, another embodiment of the method 1000 for monitoring a degree of coking at the dynamic seals is illustrated.

In this embodiment, a first step 1500 comprises the measurement of the current consumed by the starter and of the voltage on its terminals, during the phase for initiating rotation of the shaft of the gas generator by the starter, during the starting of the turbine engine.

Indeed, during this step, the starter may be considered as a DC current motor and it may therefore be considered that the torque of the electric motor is proportional to the current consumed by this motor, and that the speed of rotation of the electric motor is proportional to the voltage of the motor.

The following equations are therefore obtained:

$$Tq_m = K_1 \cdot I_m$$

$$\omega_s = \frac{V_m}{K_1}$$

Wherein:
$Tq_m$ is the torque of the electric motor,
$K_1$ is a constant,
$I_m$ is the current consumed by the electric motor,
$\omega_s$ is the speed of rotation of the starter.

The torque of the electric motor compensates for the resistive torque of the shaft of the gas generator while increasing its speed of rotation.

$$Tq_m = Tq_r + J \cdot \dot{\omega}$$

Wherein:
$Tq_r$ is the resistive torque of the shaft of the gas generator on the shaft of the starter,
J is the inertia of the load on the shaft of the starter, and
$\dot{\omega}$ is the time derivative of $\omega_s$, i.e. the acceleration of the shaft of the starter. The increase in the resistive torque may be seen through the time-dependent change of the current and of the voltage on the terminals of the electric motor—i.e. the starter.

$$Tq_r = K_1 \cdot I_m - J \cdot \frac{\dot{V}_m}{K_1}$$

A representative datum of the resistive torque of the shaft of the gas generator, which is homogenous with a current, may therefore be calculated as follows:

$$\mathrm{image}Tq_r = I_m - \alpha \cdot \dot{V}_m + \mathrm{offset}$$

Wherein:
imageTq$_r$ is a representative datum of the resistive torque of the shaft of the gas generator, obtained from the current $I_m$ consumed by the starter and from the voltage $V_m$ of its terminals,
$I_m$ is the average value of the current consumed by the electric motor during the phase for initiating the rotation of the shaft of the gas generator of the starter.
$\dot{V}_m$ is the average slope of $V_m$ during the phase for initiating rotation of the shaft of the gas generator by the starter,
a is a constant defined so that imageTq$_r$=offset for the first measurement point, i.e. that the initial resistive torque is considered to be negligible.
offset is a constant used for obtaining an always positive value of the torque in spite of the dispersion.

The step for measuring the current and the voltage on the terminals of the starter is therefore followed by a step 1600 for determining, from these measurements, the degree of coking at the dynamic seals, by calculating during a step 1610 from the previous equations, the datum imageTq$_r$ representative of the resistive torque of the shaft of the gas generator.

The current and voltage measurements are conducted with the measurement device 55, the measuring frequency of which is advantageously greater than 10 Hz.

The inference of the coking condition at the dynamic seals 1620 may be achieved in different ways.

According to a first embodiment 1621, the value of the datum imageTq$_r$, which is, as the case may be, its average value over the initiation period, may be compared with one or several predetermined thresholds, corresponding to one or several determined degrees of coking; for example a degree of coking may correspond to a number of uses of the turbine engine before the gas generator is blocked.

According to an alternative embodiment 1622, the processing unit compares the representative datum of the torque with an initial value determined during a first use or during a first setting into operation of the turbine engine. The processing unit may calculate the difference between both values and compare this difference with a predetermined threshold in order to infer therefrom, as previously, a degree of coking at the seals.

Finally, according a third embodiment, during a step 1623, the processing unit recovers data imageTq$_r$ regularly calculated under identical conditions and stored in the memory 52 and determines a changing rate in said datum depending on the use of the turbine engine.

Figure 4:
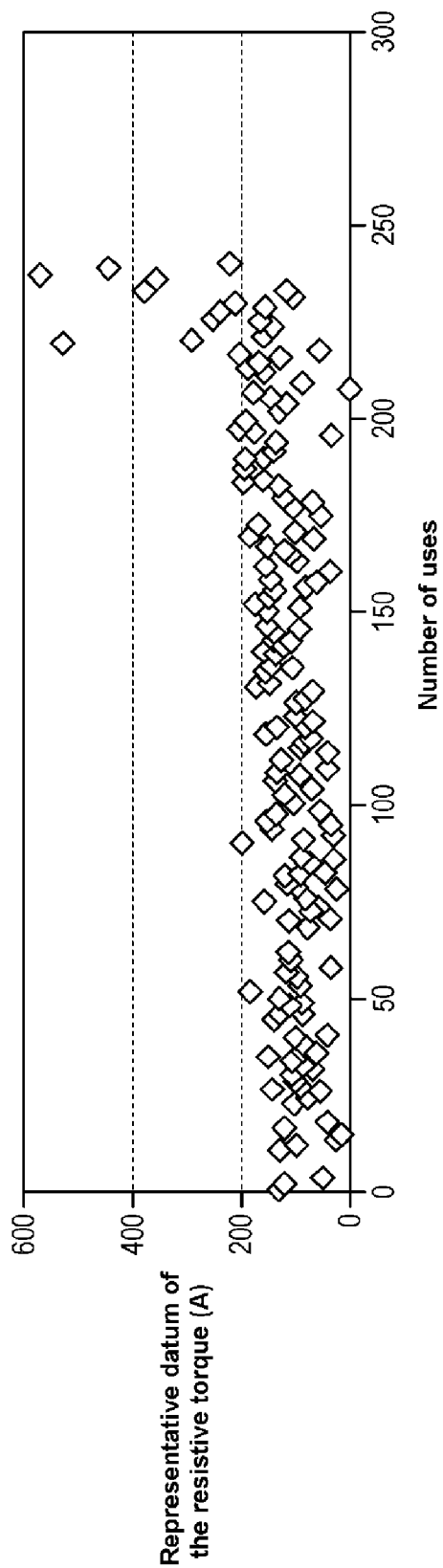
FIG. 4 illustrates the time-dependent change of a datum representative of the resistive torque of a gas generator shaft depending on the use of the turbine engine.

With reference to FIG. 4, a time-dependent change is illustrated depending on the use of the turbine engine, of the value of the image imageTq$_r$ of the resistive torque of the shaft of the gas generator. It is seen that the slope of this change also tends to increase, i.e. the resistive torque of the shaft increases more and more gradually as the degree of coking at the seals becomes significant.

Therefore, the step 1623 comprises the measurement of a changing rate of variation of the image imageTq$_r$ depending on the use of the turbine engine, and the comparison of this variation rate with a predetermined threshold.

The Use of Several Indicators for Monitoring Coking

Both indicators described herein before may be used simultaneously for corroborating or specifying the information on the degree of coking at the dynamic seals.

As an indicator of deceleration of the shaft of the gas generator is measured during a phase for stopping the turbine engine, while the indicator on the resistive torque of the shaft is measured during a starting phase, it is then advantageous to confront the results obtained after stopping the turbine engine.

The processing unit then compares the obtained results and provides a final indication on the degree of coking at the seals.

Further, depending on the degree of coking detected by one of the preceding methods, an alert may be triggered so as to set into place a phase for maintenance of the turbine engine.

The invention claimed is:
1. A method for monitoring a degree of coking at dynamic seals of a turbine engine comprising:
   a gas generator, comprising a rotary shaft and an injection wheel mounted on said rotary shaft, the injection wheel being adapted for spraying fuel by centrifugation, an injection manifold, adapted for conveying fuel as far as the injection wheel,
   dynamic seals adapted for ensuring a seal between the injection wheel and the injection manifold, and
   a starter, adapted for driving into rotation the rotary shaft of the gas generator during a starting phase of the turbine engine, wherein the method comprises the steps of:
   measuring, during an initiation phase of the rotation of the rotary shaft of the gas generator by the starter upon starting the turbine engine, a current flowing through the starter and a voltage on terminals of the starter, and
   determining, from the current and the voltage, the degree of coking at the dynamic seals,
   selectively performing maintenance on the turbine engine based on the determined degree of coking at the dynamic seals.

2. The method according to claim 1, wherein the step for determining the degree of coking at the dynamic seals comprises a determination of a datum representative of a resistive torque of the rotary shaft of the gas generator.

3. The method according to claim 2, wherein the step for determining the degree of coking at the dynamic seals comprises an application of a step from among the following group:
- comparing the datum representative of the resistive torque with a predetermined threshold,
- determining a difference between the determined datum and a representative datum of an initial resistive torque of the rotary shaft, and comparing the difference with a predetermined threshold, and
- determining from previous measurements a variation rate associated with said datum depending on the use of the turbine engine, and comparing said variation rate with a predetermined threshold.

4. The method according to claim 1, further comprising the measurement during the self-rotation phase of the rotary shaft of the gas generator, of a speed of rotation of said rotary shaft.

5. The method according to claim 4, wherein the step for determining the degree of coking at the dynamic seals is achieved from measurements of the current flowing through the starter and the voltage on the terminals of the starter and from measurements of the speed of rotation of the rotary shaft of the gas generator.

6. A monitoring system for monitoring the coking condition at the dynamic seals of the turbine engine comprising:
- the gas generator, and
- the injection wheel mounted on said rotary shaft, the injection wheel being adapted for spraying fuel by centrifugation,
- the injection manifold, adapted for conveying fuel as far as the injection wheel,
- the dynamic seals adapted for ensuring the seal between the injection wheel and the injection manifold, and
- the starter, adapted for driving into rotation the rotary shaft of the gas generator during the phase for starting the turbine engine, wherein the monitoring system is adapted for applying the method according to claim 1 and comprises:
- at least one device for measuring a voltage on the terminals of the starter and for measuring the current flowing through the starter,
- a processing unit, including a memory and processing means adapted for processing the current and voltage measurements in order to determine the degree of coking at the dynamic seals.

7. The monitoring system according to claim 6, wherein the at least one device is adapted for acquiring voltage measurements and current measurements at a frequency greater than or equal to 10 Hz.

8. The monitoring system according to claim 6, further comprising at least one sensor for the speed of rotation of the rotary shaft of the gas generator, the at least one sensor being adapted for carrying out acquisitions at a frequency greater than or equal to 2 Hz.

9. The turbine engine comprising:
- the gas generator, comprising the rotary shaft and the injection wheel mounted on said rotary shaft, the injection wheel being adapted for spraying fuel by centrifugation,
- the injection manifold, fixedly mounted relatively to the rotary shaft, and adapted for conveying fuel as far as the injection wheel,
- the dynamic seals, adapted for ensuring the seal between the injection wheel and the injection manifold, and
- the starter, adapted for driving into rotation the rotary shaft of the gas generator during the starting phase of the turbine engine, wherein the turbine engine further comprises the monitoring system according to claim 6.

* * * * *